US008615706B2

(12) United States Patent
Smith et al.

(10) Patent No.: US 8,615,706 B2
(45) Date of Patent: Dec. 24, 2013

(54) METHOD AND APPARATUS FOR IMPROVING DATA ENTRY FOR A FORM

(75) Inventors: Christopher E. Smith, Felton, CA (US);
Heidi J. Strazdus, Newark, CA (US);
Brian E. Morearty, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 1173 days.

(21) Appl. No.: 11/981,251

(22) Filed: Oct. 30, 2007

(65) Prior Publication Data
US 2009/0109455 A1    Apr. 30, 2009

(51) Int. Cl.
*G06F 17/24* (2006.01)
(52) U.S. Cl.
USPC .......................... 715/224; 715/221
(58) Field of Classification Search
USPC ................................. 715/220–231
See application file for complete search history.

(56) References Cited

U.S. PATENT DOCUMENTS

| 2006/0007189 A1* | 1/2006 | Gaines et al. ............... 345/179 |
| 2006/0174199 A1* | 8/2006 | Soltis et al. ................. 715/700 |
| 2008/0028289 A1* | 1/2008 | Hicks et al. ................. 715/224 |
| 2008/0082909 A1* | 4/2008 | Zuverink et al. ............ 715/224 |

OTHER PUBLICATIONS

MS PowerPoint 2003.*
MS Power Point 2003.*
Adobe Acrobat 7.0.*

* cited by examiner

*Primary Examiner* — Eric A Rust
(74) *Attorney, Agent, or Firm* — Park, Vaughan, Fleming & Dowler LLP

(57) ABSTRACT

One embodiment of the present invention provides a system that improves data entry for a form with one or more fields. During operation, the system displays both a printed representation of the form as well as an enhanced representation of the form that displays an enhanced view of the form's fields. When the system detects a user action related to a field displayed in one of the representations, the system adjusts the display of the field in the other representation (or in both representations) to indicate that the two fields are related. By indicating this relationship, the system facilitates entering and/or updating data for the form.

20 Claims, 9 Drawing Sheets
(6 of 9 Drawing Sheet(s) Filed in Color)

FORM 100

INSTRUCTIONS AND/OR EXPLANATION 102

DATA FIELDS 104

ELECTRONIC FORM 300

ADDITIONAL FIELD INFORMATION 500

FIG. 6

ELECTRONIC FORM 300

MOUSE-OVER HIGHLIGHTING 600

MOUSE CURSOR 312

FIG. 7

METHOD AND APPARATUS FOR IMPROVING DATA ENTRY FOR A FORM

BACKGROUND

Users often transcribe data from paper into an electronic form. For instance, a user may enter information from a paper financial statement into a program to generate a tax return, or a user may copy information from a paper invoice into an electronic inventory system. However, users often encounter problems when entering information from the paper form into an electronic form. For example, users may encounter difficulty in determining which field on the paper form corresponds to a requested field in the electronic form. Alternatively, a user may encounter difficulty in distinguishing desired data from instructions or other non-user-specific text on the paper form, or may become confused about the order in which data in the paper form should be entered into the fields in an electronic form. Such problems often lead to transcription errors during data entry.

Hence, what is needed is a method that facilitates data entry for forms without the above-described problems.

SUMMARY

One embodiment of the present invention provides a system that improves data entry for a form with one or more fields. During operation, the system displays both a printed representation of the form as well as an enhanced representation of the form that displays an enhanced view of the form's fields. When the system detects a user action related to a field displayed in one of the representations, the system adjusts the display of the field in the other representation (or in both representations) to indicate that the two fields are related. By indicating this relationship, the system facilitates entering and/or updating data for the form.

In some embodiments, the enhanced view includes a full and/or distilled list of fields for the form displayed in an alternate format and/or style than the printed representation.

In some embodiments, the enhanced view includes a magnified view of the form.

In some embodiments, the system enhances the display of a field in one or both representations using one or more user interface techniques. For instance, the system may:
highlight the field in one or both representations;
display the field in both representations using a substantially similar color;
adjust the display of the printed representation and/or enhanced representation to bring the field specified by the user action into view;
set the focus of the user interface on the field in one of the representations;
display an indicator in proximity to the field in one or both of the representations;
use animation in proximity to the field in one or both of the representations; and/or
use a visual cue for the field in one or both representations.

In some embodiments, the system may incorporate user interface techniques to convey:
that one or more fields in one or both representations do not include any entered data;
that one or more fields in one or both representations need attention; and/or
that all of the fields in one or both representations include entered data.

In some embodiments, the above-described system facilitates visual understanding of both the differences between a paper format for a form and an electronic format for a form as well as the location of data in both formats.

In some embodiments, the above-described system facilitates transcribing data from a paper form into a data management system. For instance, the system can reduce errors in transcribing data from the paper form into the data management system.

In some embodiments, the above-described system facilitates checking that data on the paper form matches data in the data management system.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 1 illustrates a form that is typically printed and completed manually in accordance with an embodiment of the present invention.

FIG. 2 illustrates an interview-style electronic form that can be used by a computer application to gather data from a user in accordance with an embodiment of the present invention.

FIG. 5 illustrates the display of additional field information for a selected field in a form in response to a user request in accordance with an embodiment of the present invention.

FIG. 6 illustrates "mouse-over" highlighting for an electronic form in accordance with an embodiment of the present invention.

FIG. 7 illustrates an electronic form in which the system displays a magnified view of the printed representation in the enhanced representation in accordance with an embodiment of the present invention.

DETAILED DESCRIPTION

Figure 3:
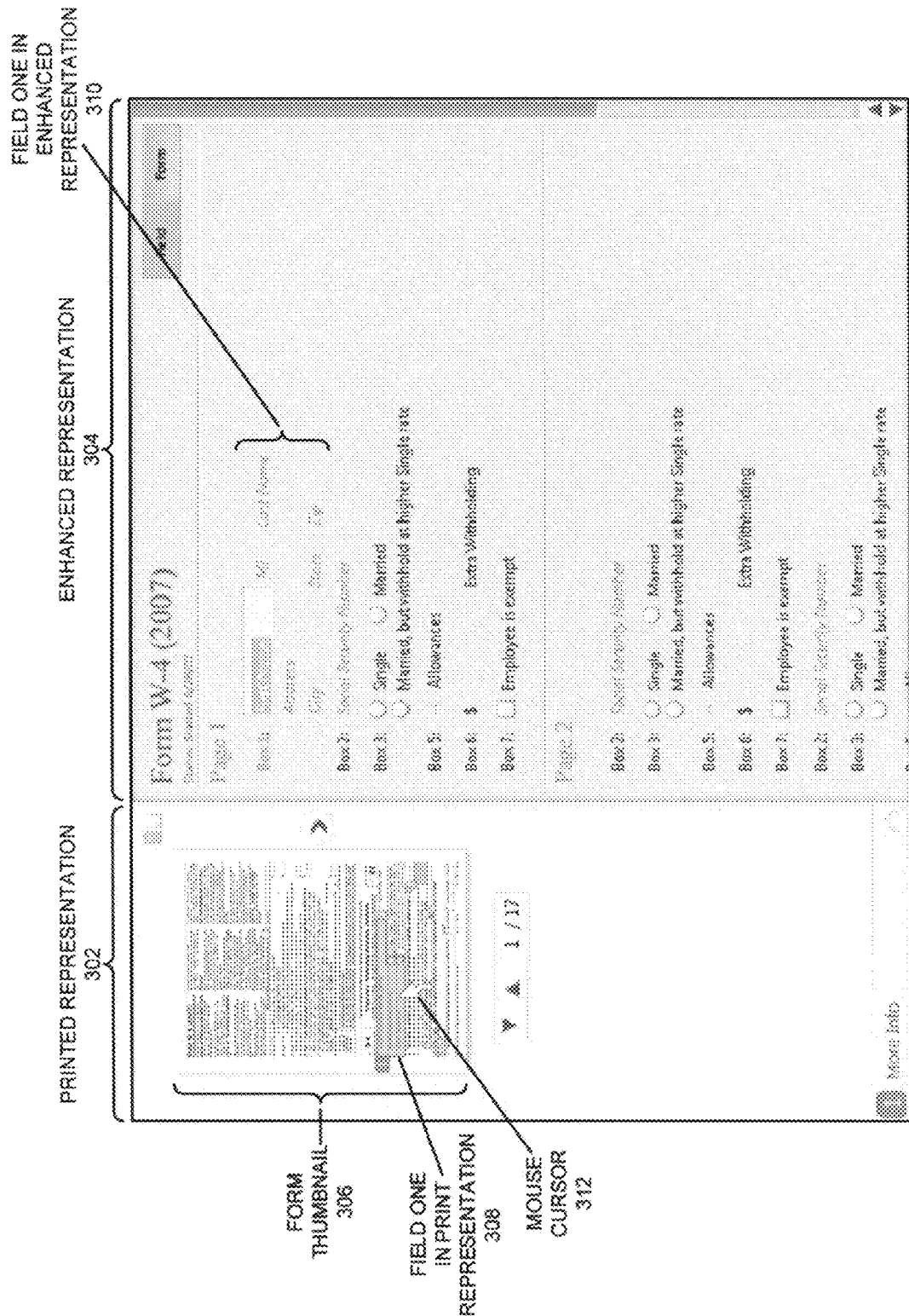
FIG. 3 illustrates an electronic form that includes both a printed representation and an enhanced representation that are visually linked to improve navigation through the form in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital

Overview

Figure 1:
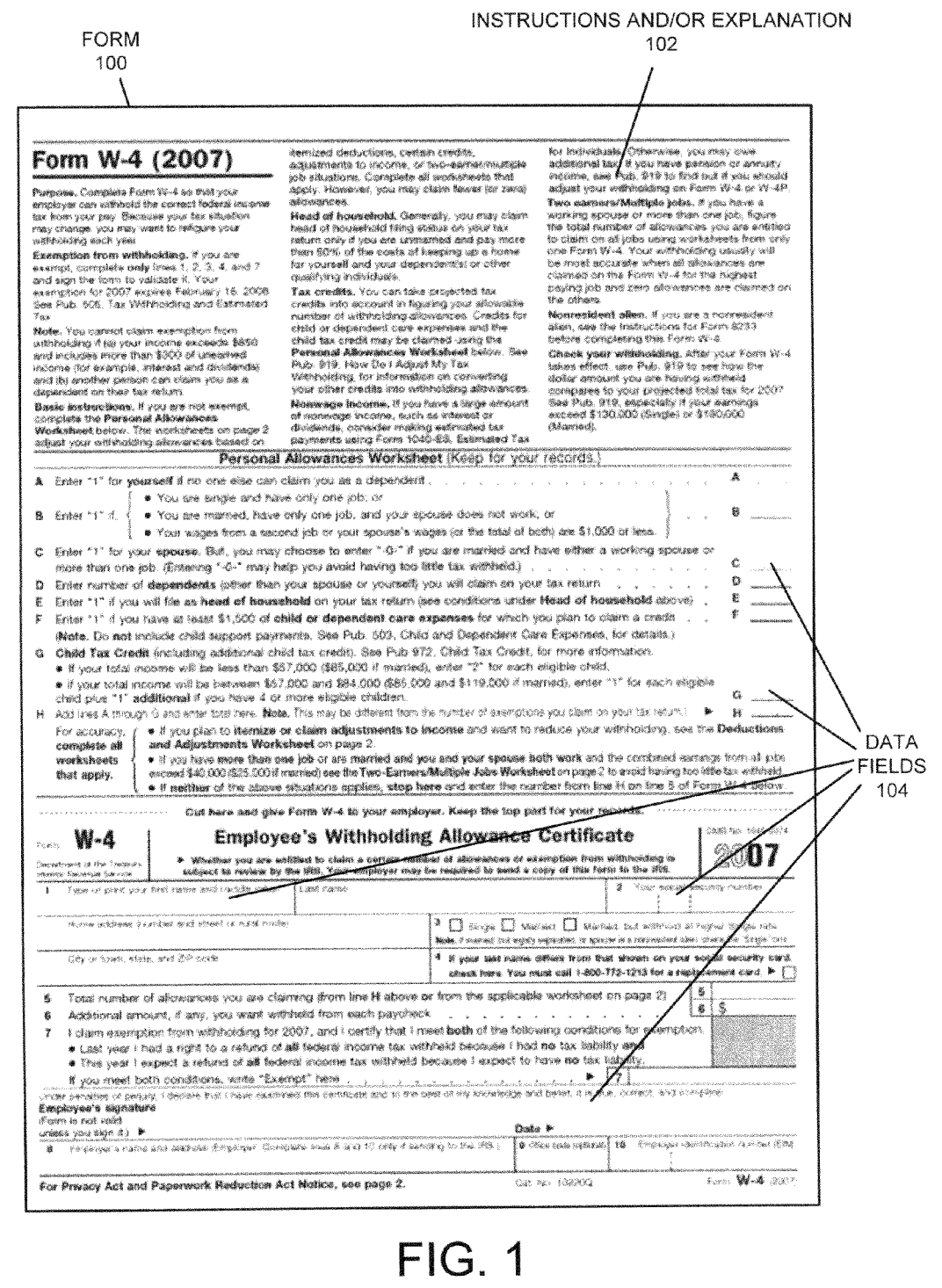

FIG. 1 illustrates a form 100 that is typically printed and completed manually. Note that form 100 includes a set of instructions and/or explanatory text 102, as well as a set of data fields 104 into which a user can enter data.

Figure 2:
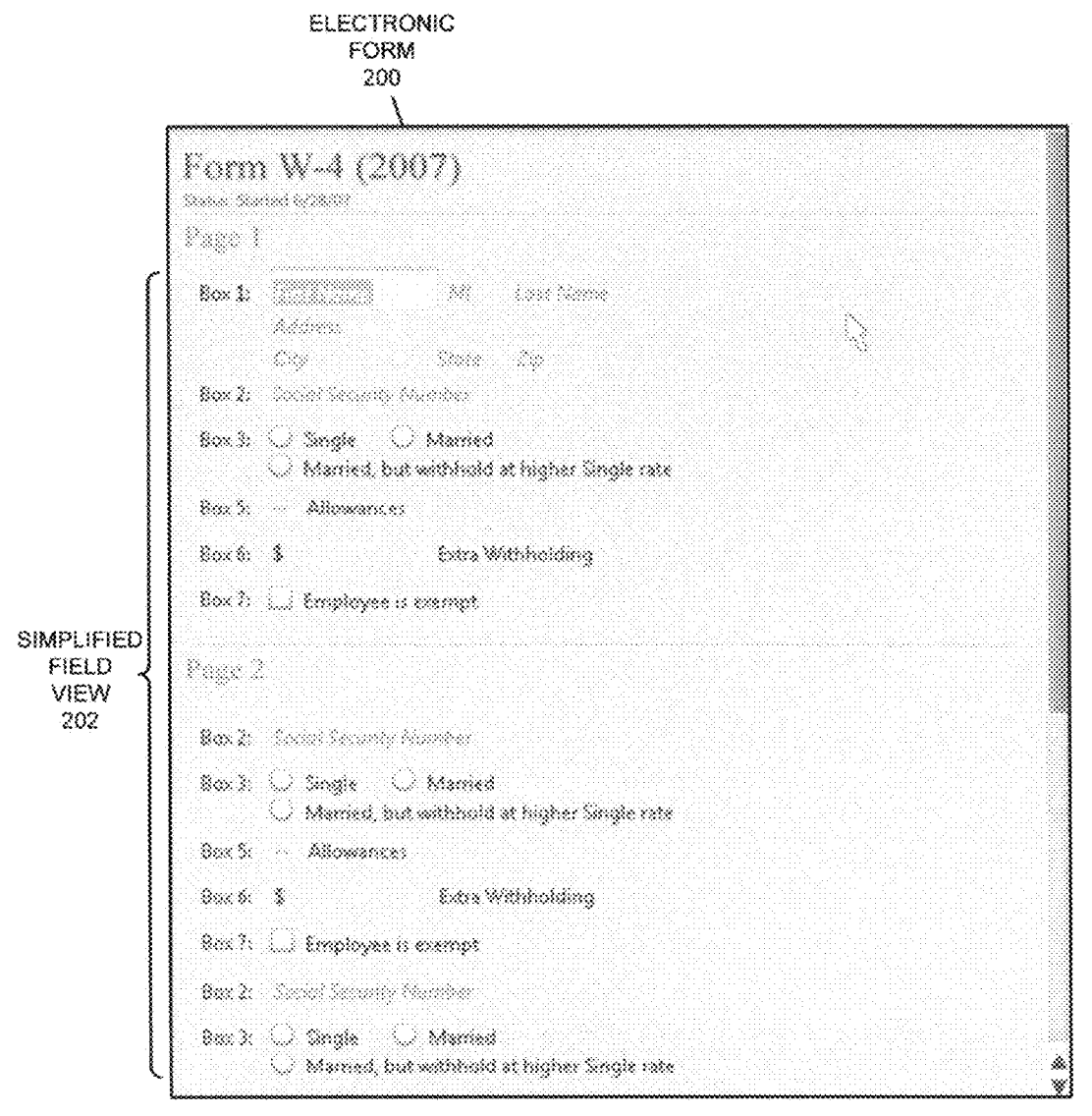

FIG. 2 illustrates an interview-style electronic form 200 that can be used by a computer application to gather data from a user. This electronic form 200 may request some or all of the same data as form 100, but uses a different format. For instance, in FIG. 2, electronic form 200 displays a simplified field view 202 for the form that includes only a limited set of instructions and/or explanations (e.g., box numbers and name labels for the data fields). Factors such as a different layout, and a difference in the number of fields displayed between form 100 and electronic form 200, can make it difficult to transcribe data from form 100 into electronic form 200. For example, there may be insufficient text and/or context available for users to determine the next input field (from form 100) to be entered into electronic form 200, and many users may find navigating between the fields in the different format to be difficult or counter-intuitive compared to the format of form 100. However, some of the information and layout in form 100 may only make sense in a printed version. Hence, including all of the text from form 100 in electronic form 200 may add unnecessary clutter and consume valuable display space with limited benefit. For instance, a user entering data into an electronic form that mirrors form 100 precisely may need to scroll left and right when entering data (in addition to the more typical up and down-scrolling). This, along with other differences, may cause the user to spend more time searching for fields and determining which fields are important. Furthermore, a user transcribing data from form 100 to electronic form 200 may not need instructions for deriving data field values, but instead may only need to transcribe previously-calculated data from the data fields 104. Moreover, using a computing device to navigate through a form which is optimized for print output can be challenging, and including such additional instructions in electronic form 200 may only confuse and distract a user.

In one embodiment of the present invention, the system includes a technique that facilitates visually navigating through forms when entering data from a printed form into an electronic form on a computing device. In this embodiment, multiple representations of a form are displayed in a manner that allows users to clearly determine relationships between fields in a printed representation of the form and an enhanced representation of the form. This technique allows users to understand how the fields of the printed form correspond to the fields in the electronic form, thereby, reducing transcription errors.

FIG. 3 illustrates an electronic form 300 that includes both a printed representation 302 and an enhanced representation 304 that are visually linked to improve form navigation. In FIG. 3, the printed representation comprises a thumbnail view 306 of the print layout of a (e.g., form 100), while the enhanced representation 304 includes a simplified field view 202 for fields in the form. When a user selects a field in one of the representations, the system adjusts the display of the same field in the other representation (or in both representations) to indicate the relationship between the two fields. For instance, when the user uses mouse cursor 312 to select field one in the printed representation 308, the system highlights the field in orange (as shown) in the printed representation 302 while also coloring the "Box 1" label for field one in the enhanced representation 310 with the same color. Note that this relationship is bi-directional. For instance, the system can similarly indicate the relationship in the reverse direction, by coloring field one in both representations if the user uses mouse cursor 312 to select field one in the enhanced representation 310. Hence, the system enables a user viewing the display of the two representations to determine the location of source data on a paper form (by comparing the field indicated in the printed representation 302 with the paper form being transcribed from) and a destination field in the electronic form 200 (displayed in the enhanced representation), thereby providing context during data entry and reducing the likelihood of errors. Simultaneously displaying both representations and their field relationships provides a visual map between the different display formats of the different representations.

In one embodiment of the present invention, the system uses one or more user interface techniques to indicate a relationship between fields in two (or more) representations. For instance, the system can:

highlight one or more fields in one or more representations;

display one or more fields in one or more representations using a substantially similar color;

adjust the display of the printed representation and/or the enhanced representation to display a field specified by a user action (e.g., automatically scroll an off-screen field into view when the corresponding field is selected in the alternate representation);

set the focus of the user interface on the field in one of the representations (e.g., set the keyboard focus on a field in the enhanced representation 304 after the corresponding field is selected in the printed representation 302);

display an indicator in proximity to the field in one or more of the representations (e.g., displaying a matching field number or symbol in both representations for a given field);

use animation in proximity to a field in one or more of the representations; and/or use a visual cue for a field in one or more representations.

Figure 4:
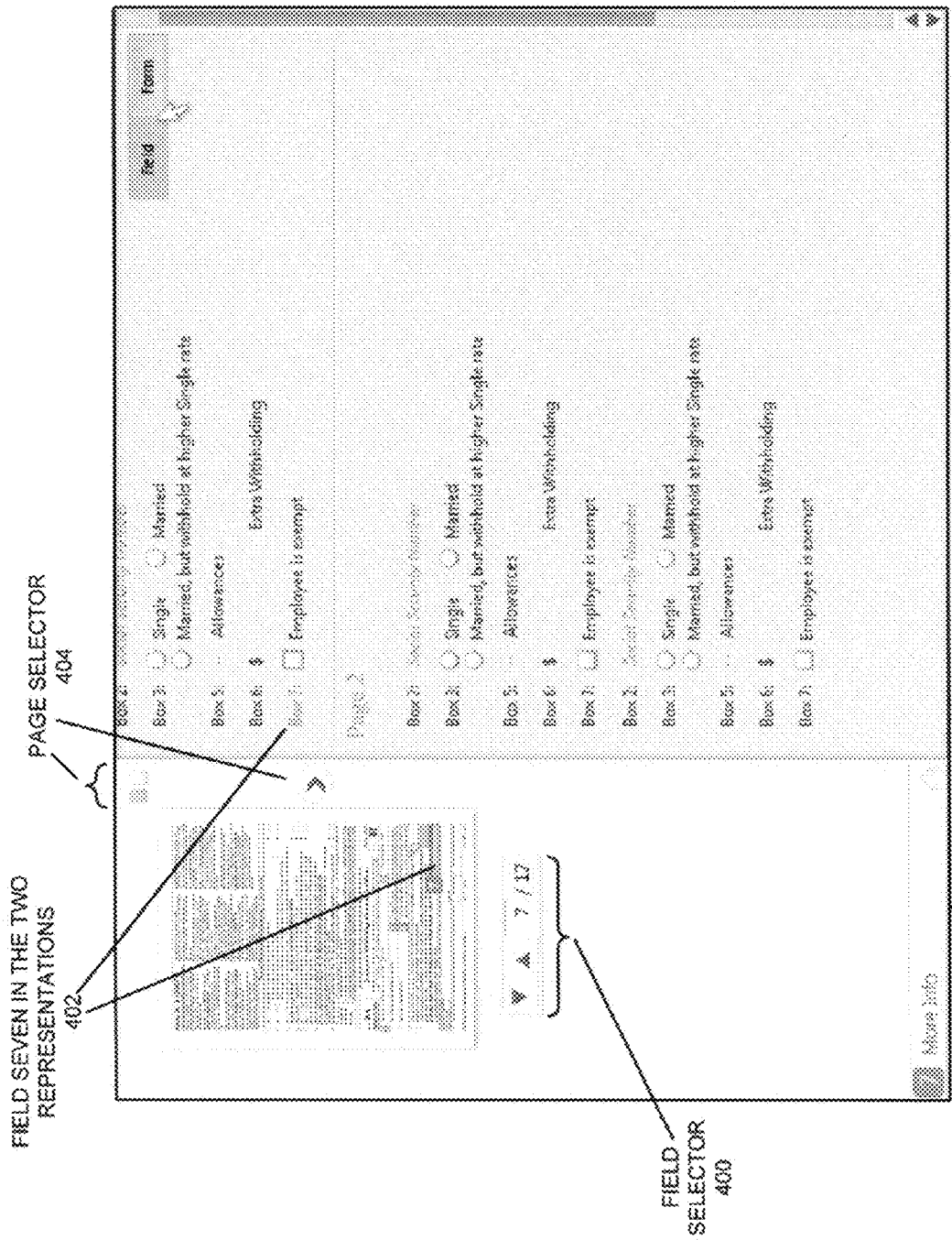
FIG. 4 illustrates additional functionality for an electronic form in accordance with an embodiment of the present invention.

FIG. 4 illustrates additional functionality for an electronic form 300. In FIG. 4, in addition to selecting a field in the form thumbnail 306 or enhanced representation 304, a user can select a field (in FIG. 4, field seven out of seventeen) using a field selector 400. In response, the system displays the relationship between field seven in the two representations 402 (e.g., by highlighting the field in the printed representation 302 and changing the color of the corresponding label in the enhanced representation 304). Note that field selector 400 can be implemented in a number of ways, for instance by using up/down arrows for navigating between fields, or by using an input field that allows a user to directly select (or "jump to") a given field by entering a desired field number. The electronic form 300 can also include a page selector 404 that provides users with context information conveying the number of pages in a displayed form and the page number of the page presently being displayed in the printed representation 302. For instance, when a user selects a field on the second page of a form using field selector 400, the system may automatically change the form thumbnail 306 to display the second page of the form and update the page selector 404 appropriately. Alternatively, a user may select a different page directly using page selector 404, in which case the system may respond by updating the enhanced representation 304 to emphasize the fields displayed on the presently-displayed page.

Figure 5:
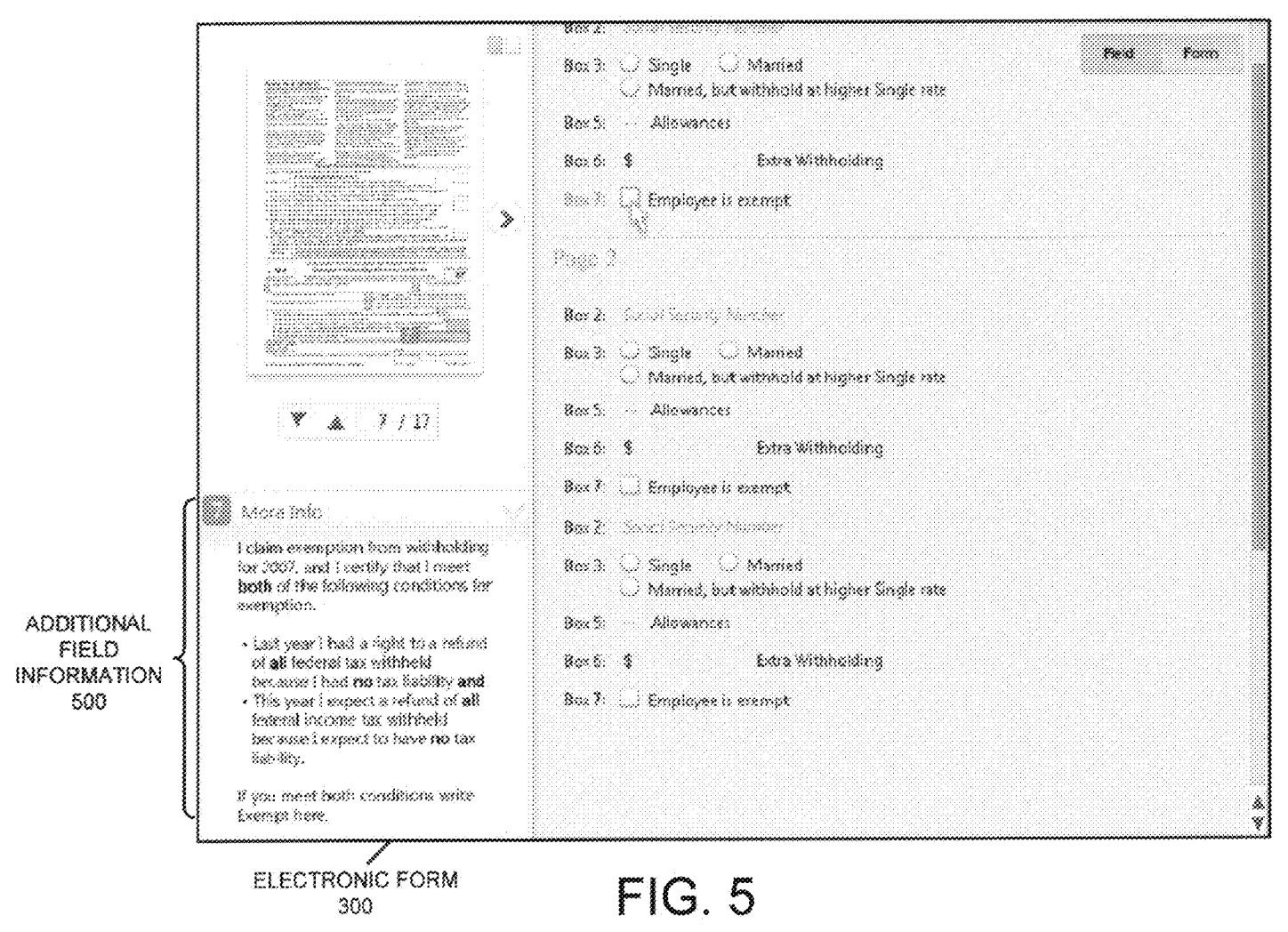

In one embodiment of the present invention, the system can produce additional navigational, context, and form- or fieldspecific information on demand. For instance, even after the system has adjusted the display of electronic form 300 to indicate the relationship between field seven in the two representations 402 (as shown in FIG. 4), a user may still be uncertain about the meaning and/or context of field seven, and request additional information. FIG. 5 illustrates the display of additional field information 500 for a selected field (as shown in FIG. 5 for field seven) in response to a user request.

Figure 6:
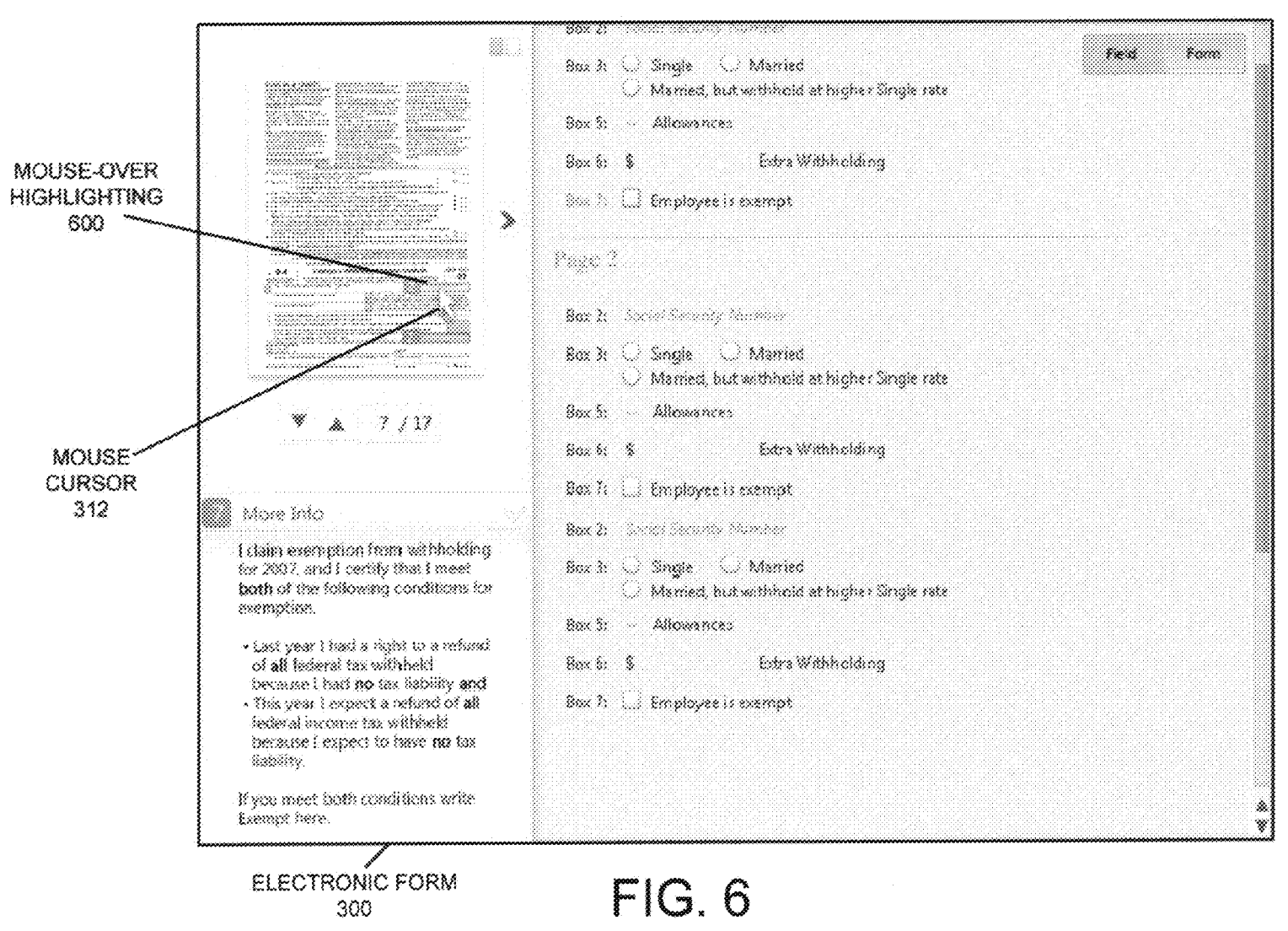

In one embodiment of the present invention, the system can include additional hints to indicate areas of interest and/or relevance in a given form. For instance, the system can display in the printed representation 302 an exact replica of the form 100 with interactive areas that indicate user-modifiable fields (e.g., fields that are highlighted when the mouse cursor passes over them). FIG. 6 illustrates "mouse-over" highlighting 600, where a mouse cursor 312 passing over a user-modifiable field (field two in FIG. 6) causes the field to be highlighted. Alternatively, the system may adjust the display of one or both representations to indicate to the user that:

one or more fields in the form do not include any entered data;
one or more fields in the form need attention (e.g., need to be reviewed or signed); and/or
all of the fields in the form include entered data.

The system can use a variety of user interface techniques to indicate to the user whether input is needed, and then facilitate jumping to the corresponding area of the form (in one or both representations).

In one embodiment of the present invention, the enhanced representation 304 can display either a full or a distilled list of list of fields for a given form. These fields can be displayed in an alternate format from that used in the printed representation. In one embodiment, this list may include a list of data entry fields with labels (as shown in FIG. 3). Alternatively, the enhanced representation can include a magnified view of the form displayed in the printed representation 302. Such a magnified view can facilitate user identification of modifiable fields.

Figure 7:
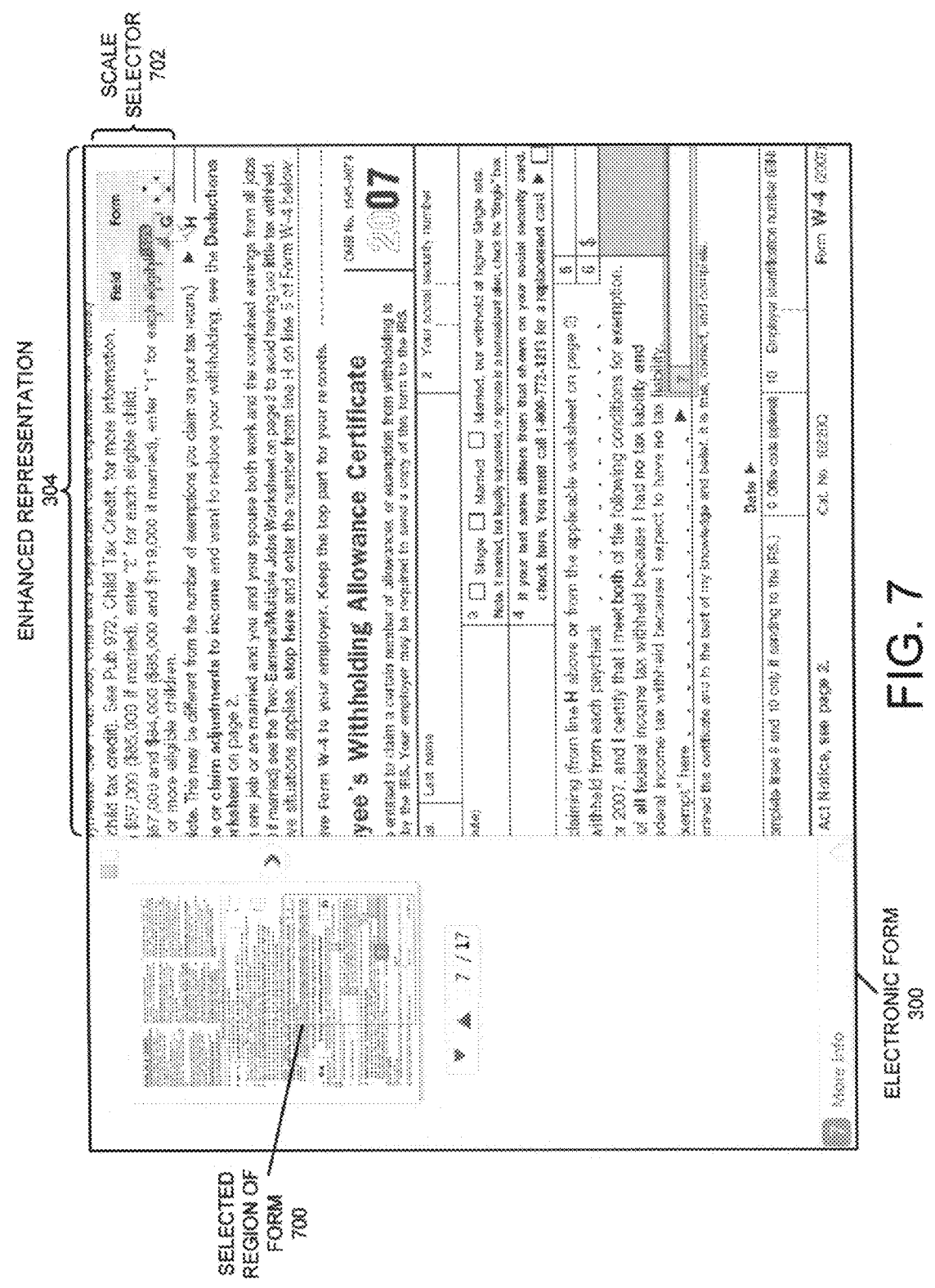

FIG. 7 illustrates an electronic form 300 in which the system displays a magnified view of the printed representation 302 in the enhanced representation 304. The system can indicate in the printed representation 302 the selected region of the form 700 that is displayed in the enhanced representation 304. Note that the system can continue to indicate the relationship between a field in the printed representation 302 and the magnified view in the enhanced representation 304 as described previously (e.g., in FIG. 7, by displaying field seven using a substantially similar color in both representations). Note also that the system can also include a scale selector 702 and navigational controls that allow users to manipulate and adjust the scale and viewing area of the magnified view.

Figure 8:
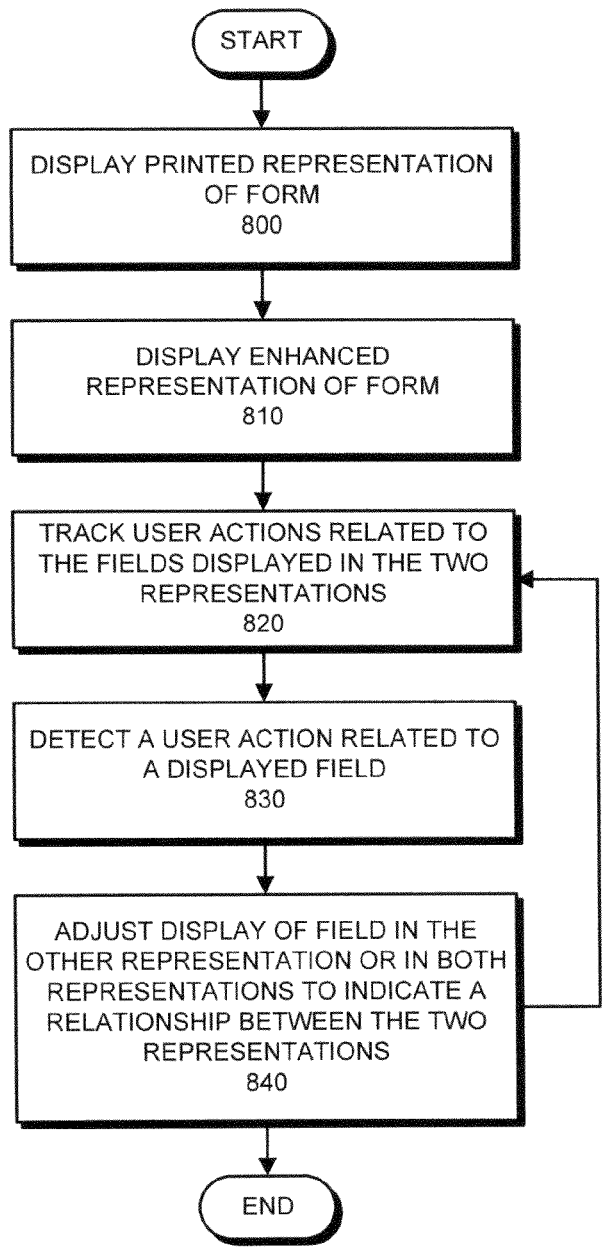
FIG. 8 presents a flow chart illustrating the process of improving data entry for a form in accordance with an embodiment of the present invention.

FIG. 8 presents a flowchart illustrating the process of improving data entry for a form that includes one or more fields. During operation, the system displays a printed representation of the form (operation 800) and an enhanced representation of the form (operation 810), where the enhanced representation of the form displays an enhanced view of some or all of the fields in the form. After displaying the two representations, the system then tracks user actions that relate to the fields displayed in the representations (operation 820). When the system detects a user action (e.g., a mouse event) related to a displayed field in one of the representations (operation 830), the system adjusts the display of the field in the other representation or in both representations to indicate the relationship between the field in the two representations (operation 840). By indicating this relationship, the system facilitates entering and/or updating data for the form. Note that a number of such adjustments may be made through an iterative adjustment process (as indicated by the path from operation 840 to operation 820).

In one embodiment of the present invention, displaying the relationships between corresponding fields facilitates visual understanding of both the differences between a paper format for a form and an electronic format for a form as well as the location of data in both formats. This visual understanding can facilitate transcribing or updating data from a paper form into a data management system by simplifying form navigation and increasing the likelihood that data will be entered in the correct fields, thereby reducing errors during the transcription process. Alternatively, the system can also facilitate checking that data on the paper form matches data in the data management system, for instance by allowing a user to immediately jump to a particular field in an electronic form to visually confirm that the paper record matches the electronic record. This capability can be especially beneficial when the person entering or checking data is not an expert in the topic area of the form.

Figure 9:
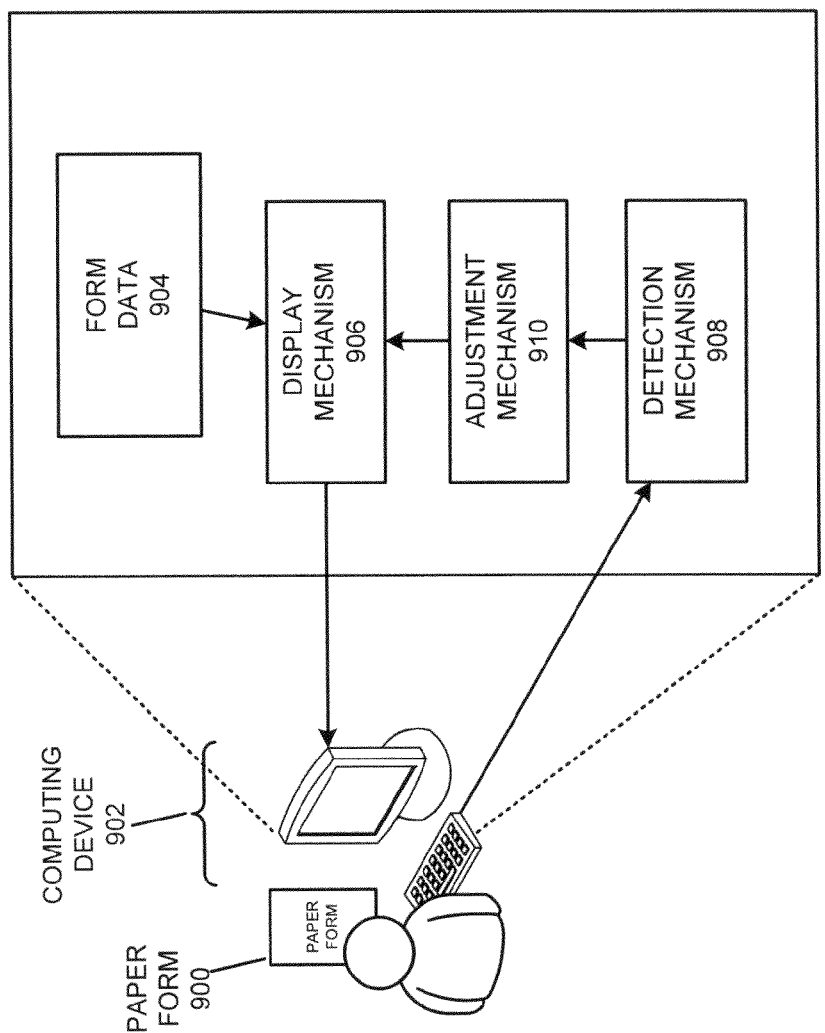
FIG. 9 illustrates a data entry environment that includes a user transcribing a paper form into a computing device in accordance with an embodiment of the present invention.

FIG. 9 illustrates a data entry environment that includes a user transcribing a paper form 900 into a computing device. This computing device 902 uses form data 904 and a display mechanism 906 to display a printed representation and an enhanced representation of the paper form 900 during a data entry session. During operation, a detection mechanism 908 in the computing device 902 detects user actions related to a field displayed in one of the representations. This detection mechanism 908 notifies an adjustment mechanism 910, which adjusts the display of the field in the other representation (or in both representations) to indicate that the two fields are related. Note that the display mechanism 906 and form data 904 may follow rigid guidelines that precisely specify the expected layout of a printed representation (e.g., for a standard tax form). Alternatively, display mechanism 906 and form data 904 can be flexibly defined to adapt to a form with a range of fields in many possible configurations.

In summary, one embodiment of the present invention improves data entry for a form by indicating relationships between corresponding fields in two different representations of the form. User action in each representation triggers synchronized identification of (and updates to) the corresponding field in the other representation, thereby promoting a visual cue about the relationship between the two different representations and facilitating data entry.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for improving data entry for a form, wherein the form includes one or more fields, comprising:
displaying a printed representation of the entire form, the printed representation being a print preview of the entire form, wherein the area of the displayed printed representation includes a separate field selector comprising at least one of: up/down arrows for navigating between the one or more fields when more than one field exists, and an input field entry box to enter a desired field number;
presenting an enhanced representation of the entire form that presents an enhanced view of the one or more fields in the form, wherein the printed representation and the enhanced representation do not overlap when simultaneously displayed;

subsequent to said displaying and said presenting, detecting a user action comprising a field selection in the displayed area of the printed representation, wherein the field selection comprises one of:

clicking an up field selector arrow;

clicking a down field selector arrow; or entering a field number in the input field entry box; and adjusting only a display of a field of the one or more fields in both representations to indicate a relationship between the field that is displayed in both the printed representation and the the enhanced representation, wherein the selected field displayed in both the printed representation and the enhanced representation are separately and simultaneously displayed to the user, wherein the selected field displayed in both representations is visually enhanced, and wherein said adjusting comprises:

responsive to detecting a user action related to a field displayed in the printed representation, adjusting only a display of a field corresponding to the detected field displayed in the printed presentation in both representations, responsive to detecting a user action related to a field displayed in the enhanced representation, adjusting only a display of a field corresponding to the detected field displayed in the enhanced presentation in both representations; and responsive to detecting a user action related to the field selector displayed in the area of the printed representation, adjusting only the display of the selected field in both representations;

wherein indicating the relationship facilitates entering and/or updating data for the form.

2. The method of claim 1, wherein the enhanced view includes a full and/or distilled list of the one or more fields for the form displayed in an alternate format from the printed representation.

3. The method of claim 1, wherein the enhanced view includes a magnified view of the form.

4. The method of claim 1, wherein adjusting only the display of the field of the one or more fields comprises enhancing the display of the field of the one or more fields in one or both representations using a user interface technique.

5. The method of claim 4, wherein the user interface technique comprises one or more of the following:

highlighting the field of the one or more fields in one or both representations;

displaying the field of the one or more fields in both representations using a substantially similar color;

adjusting the display of the printed representation and/or enhanced representation to display the field of the one or more fields specified by the user;

setting the focus of the user interface on the field of the one or more fields in one of the representations;

displaying an indicator in proximity to the field of the one or more fields in one or both of the representations;

using animation in proximity to the field of the one or more fields in one or both of the representations; and/or using a visual cue for the field of the one or more fields in one or both representations.

6. The method of claim 5, wherein the method further comprises one or more of the following:

using the user interface technique to convey in one or both representations that one or more fields of the one or more fields in the form do not include any entered data;

using the user interface technique to convey in one or both representations that one or more fields of the one or more fields in the form need attention; and/or using the user interface technique to convey in one or both representations that all of the fields of the one or more fields in the form include entered data.

7. The method of claim 1, wherein the method reduces errors in transcribing data from the form into a data management system.

8. The method of claim 1, wherein the method facilitates checking that data on the form matches data in a data management system.

9. A non-transitory computer-readable storage medium storing instructions that when executed by a computer cause the computer to perform a method for improving data entry for a form, wherein the form includes one or more fields, the method comprising:

displaying a printed representation of the entire form, the printed representation being a print preview of the entire form, wherein the area of the displayed printed representation includes a separate field selector comprising at least one of: up/down arrows for navigating between the one or more fields when more than one field exists, and an input field entry box to enter a desired field number;

presenting an enhanced representation of the entire form that presents an enhanced view of the one or more fields in the form, wherein the printed representation and the enhanced representation do not overlap when simultaneously displayed;

subsequent to said displaying and said presenting, detecting a user action comprising a field selection in the displayed printed representation, wherein the field selection comprises one of:

clicking an up field selector arrow;

clicking a down field selector arrow; or entering a field number in the input field entry box; and adjusting only a display of a field of the one or more fields in both representations to indicate a relationship between the field that is displayed in both the printed representation and the the enhanced representation, wherein the selected field displayed in both the printed representation and the enhanced representation are separately and simultaneously displayed to the user, wherein the selected field displayed in both representations is visually enhanced, and wherein said adjusting comprises:

responsive to detecting a user action related to a field displayed in the printed representation, adjusting only a display of a field corresponding to the detected field displayed in the printed presentation in both representations, responsive to detecting a user action related to a field displayed in the enhanced representation, adjusting only a display of a field corresponding to the detected field displayed in the enhanced presentation in both representations, and responsive to detecting a user action related to the field selector displayed in the area of the printed representation, adjusting only the display of the selected field in both representations;

wherein indicating the relationship facilitates entering and/or updating data for the form.

10. The non-transitory computer-readable storage medium of claim 9, wherein the enhanced view includes a full and/or distilled list of the one or more fields for the form displayed in an alternate format from the printed representation.

11. The non-transitory computer-readable storage medium of claim 9, wherein the enhanced view includes a magnified view of the form.

12. The non-transitory computer-readable storage medium of claim 9, wherein adjusting only the display of the field of the one or more fields comprises enhancing the display of the field of the one or more fields in one or both representations using a user interface technique.

13. The non-transitory computer-readable storage medium of claim 12, wherein the user interface technique comprises one or more of the following:
   highlighting the field of the one or more fields in one or both representations;
   displaying the field of the one or more fields in both representations using a substantially similar color;
   adjusting the display of the printed representation and/or enhanced representation to display the field of the one or more fields specified by the user;
   setting the focus of the user interface on the field of the one or more fields in one of the representations;
   displaying an indicator in proximity to the field of the one or more fields in one or both of the representations;
   using animation in proximity to the field of the one or more fields in one or both of the representations; and/or
   using a visual cue for the field of the one or more fields in one or both representations.

14. The non-transitory computer-readable storage medium of claim 13, wherein the method further comprises one or more of the following:
   using the user interface technique to convey in one or both representations that one or more fields of the one or more fields in the form do not include any entered data;
   using the user interface technique to convey in one or both representations that one or more fields of the one or more fields in the form need attention; and/or
   using the user interface technique to convey in one or both representations that all of the fields of the one or more fields in the form include entered data.

15. The non-transitory computer-readable storage medium of claim 9, wherein the method reduces errors in transcribing data from the form into a data management system.

16. The non-transitory computer-readable storage medium of claim 9, wherein the method facilitates checking that data on the form matches data in a data management system.

17. An apparatus that improves data entry for a form, wherein the form includes one or more fields, comprising:
   a display mechanism configured to display a printed representation of the entire form, the printed representation being a print preview of the entire form, wherein the display mechanism is further configured to include a separate field selector in the area of the displayed printed representation, the separate field selector comprising at least one of: up/down arrows for navigating between the one or more fields when more than one field exists, and an input field entry box to enter a desired field number;
   wherein the display mechanism is further configured to present an enhanced representation of the entire form that presents an enhanced view of the one or more fields in the form, wherein the printed representation and the enhanced representation do not overlap when simultaneously displayed;
   a detection mechanism configured to detect, subsequent to said displaying and presenting, a user action comprising a field selection in the displayed printed representation, wherein the field selection comprises one of:
   clicking an up field selector arrow;
   clicking a down field selector arrow; or
   entering a field number in the input field entry box; and
   an adjustment mechanism configured to adjust only a display of a field of the one or more fields in both representations to indicate a relationship between the field that is displayed in both the printed representation and the the enhanced representation, wherein the selected field displayed in both the printed representation and the enhanced representation are separately and simultaneously displayed to the user, wherein the selected field displayed in both representations is visually enhanced, and wherein said adjusting with the adjustment mechanism comprises:
      responsive to detecting a user action related to a field displayed in the printed representation, adjusting only a display of a field corresponding to the detected field displayed in the printed presentation in both representations,
      responsive to detecting a user action related to a field displayed in the enhanced representation, adjusting only a display of a field corresponding to the detected field displayed in the enhanced presentation in both representations, and
      responsive to detecting a user action related to the field selector displayed in the area of the printed representation, adjusting only the display of the selected field in both representations;
   wherein indicating the relationship facilitates entering and/or updating data for the form.

18. The apparatus of claim 17, wherein the adjustment mechanism is further configured to enhance the display of the field of the one or more fields in one or both representations using a user interface technique.

19. The apparatus of claim 17, wherein the apparatus reduces errors in transcribing data from the form into a data management system.

20. The apparatus of claim 17, wherein the apparatus facilitates checking that data on the form matches data in a data management system.

* * * * *